July 25, 1950  C. A. DE GIERS ET AL  2,516,452
LIQUID LEVEL INDICATING DEVICE
Filed March 27, 1946  4 Sheets-Sheet 1

INVENTORS
CLARENCE A. DE GIERS
LOUIS M. CAMPANI
BY Ernest D. Givan
ATTORNEY

July 25, 1950 C. A. DE GIERS ET AL 2,516,452
LIQUID LEVEL INDICATING DEVICE
Filed March 27, 1946 4 Sheets-Sheet 2

INVENTORS
CLARENCE A. DE GIERS
LOUIS M. CAMPANI
BY
ATTORNEY

July 25, 1950  C. A. DE GIERS ET AL  2,516,452
LIQUID LEVEL INDICATING DEVICE
Filed March 27, 1946  4 Sheets-Sheet 3
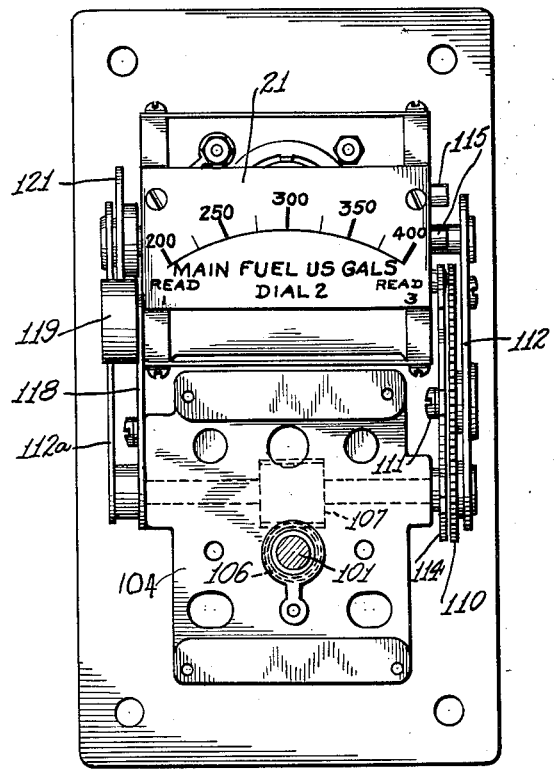
Fig.4.
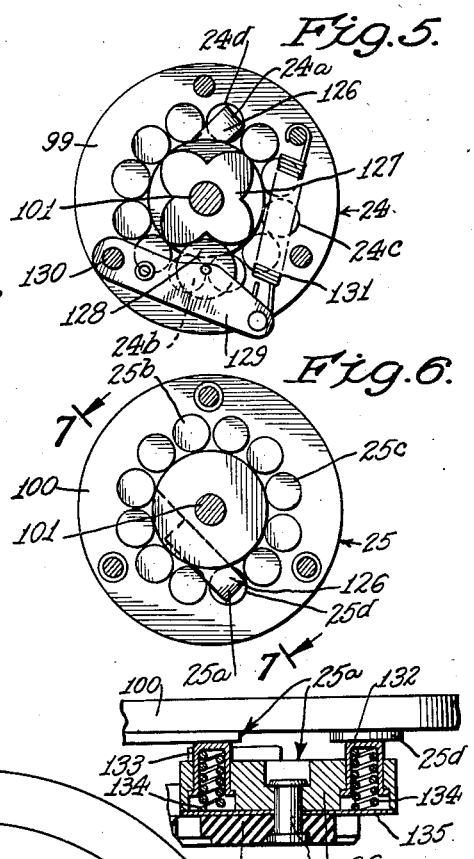
Fig.5.
Fig.6.
Fig.7.
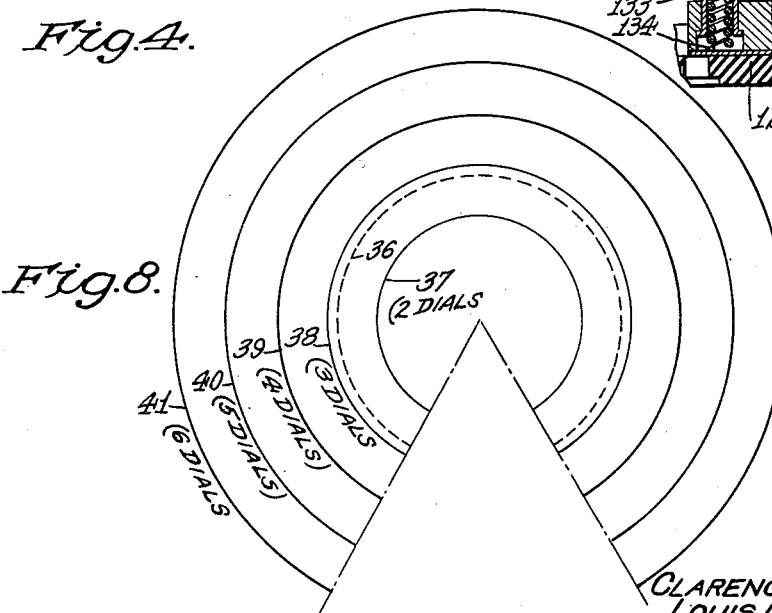
Fig.8.
INVENTORS
CLARENCE A. DE GIERS
LOUIS M. CAMPANI
BY
Ernest D. Given
ATTORNEY

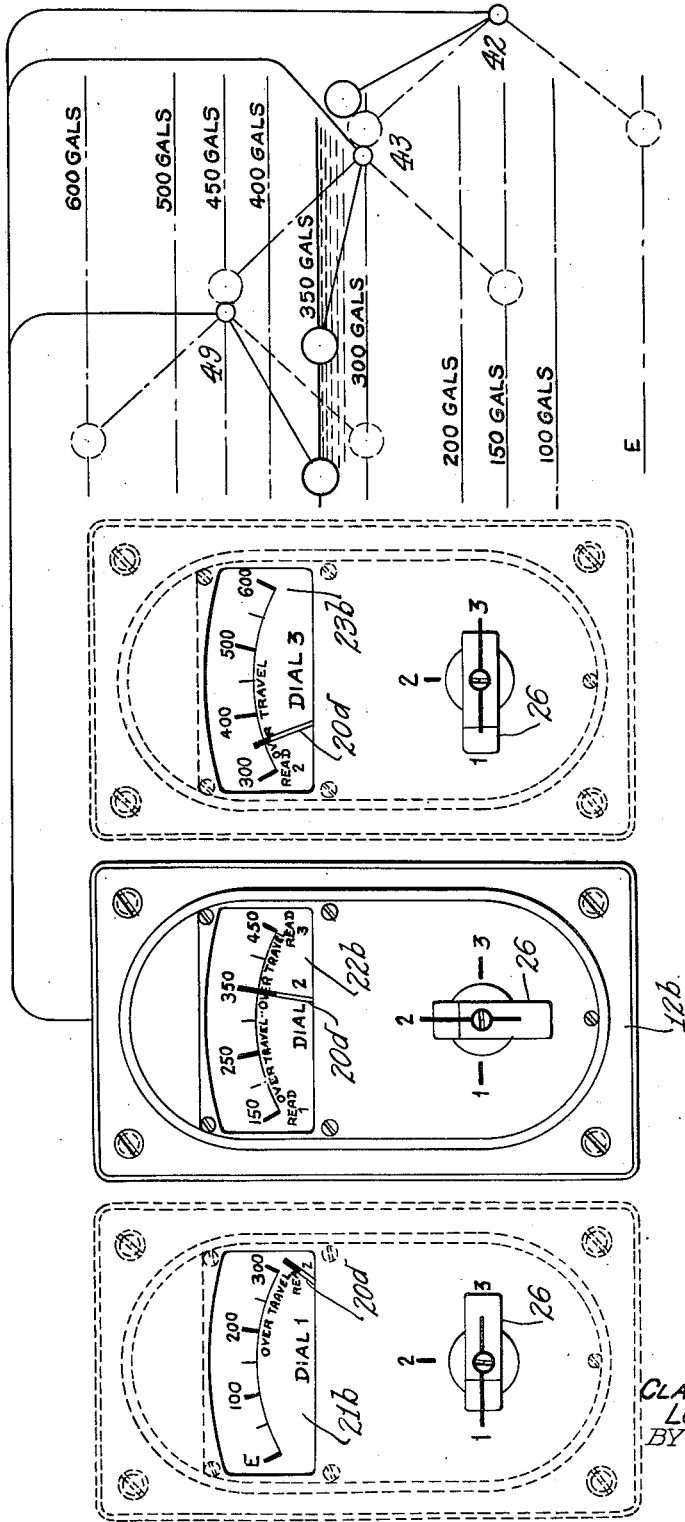

UNITED STATES PATENT OFFICE 2,516,452

LIQUID LEVEL INDICATING DEVICE

Clarence A. de Giers, Forest Hills, and Louis M. Campani, Freeport, N. Y., assignors to The Liquidometer Corporation, Long Island City, N. Y., a corporation of Delaware Application March 27, 1946, Serial No. 657,393

1 Claim. (Cl. 73—313)

This invention relates to electrical indicating and telemetric systems, and particularly to the measurement of a fluid in a container or tank.

One of the objects of the invention is to provide an electrical system and a combination of instrumentalities for measuring the contents of fuel tanks, either stationary or for aircraft, whereby the effective scale length of the indicator is multiplied several times without enlargement of the space required by the indicator.

Another object of the invention is to improve the accuracy, and increase the readability of the measuring system.

A further object of the invention is to provide, for a given tank, a number of transmitting elements which are independent of each other to the extent that a failure in any one of them will not affect the performance or accuracy of other parts of the complete system, but merely of the element affected.

A further object of the invention is to provide means whereby the errors due to the tilting of a tank, such as when used for aircraft can be substantially reduced.

A further object of the invention is to provide a system which is simple to maintain and install.

In present day aircraft, the panel space is very limited due to the multiplicity of instruments required for its operation. Hence the size and scale length of each indicator is necessarily limited, reducing the readability and accuracy of the system. This condition is further aggravated by the increase in size of fuel tanks of modern planes which require that much larger capacities be indicated on existing indicator thus causing the scale calibration to become even more crowded. A further limitation of existing systems is that a failure in the transmitter will usually render the whole system useless. In aircraft this is a serious condition since the pilot will not be able to know the amount of gas which he has left to continue his flight.

In a preferred form of the invention, it is proposed to use an indicator cooperating with a number of float operated transmitter elements. The indicator is equipped with a number of dials, only one of which appears on the face of the indicator at a given time. The dials are selected by a suitable mechanism controlled by a knob on the face of the instrument. This knob simultaneously operates an electrical selector switch connecting to the various transmitting elements in the system. The transmitting elements are suitably located at different levels in the tank to be gauged so that each float covers a portion of the total vertical height of the tank.

Since each transmitter is made to indicate on a separate dial, the effective scale length is multiplied by the number of transmitter elements used without increasing the size of the receiver. Also, since each transmitter is mechanically and electrically separate from all the others, failure in any one will only disrupt the operation of the system over its range leaving all others to operate at their original accuracy.

Other and further objects of this invention will be more apparent after an examination of the specification in conjunction with the accompanying drawings. It is understood, however, that the drawings are for purpose of illustration only and are not intended to define the limits of the invention.

In the drawings:

Fig. 4 is a front view of one of the indicators employed;

Figure 3:
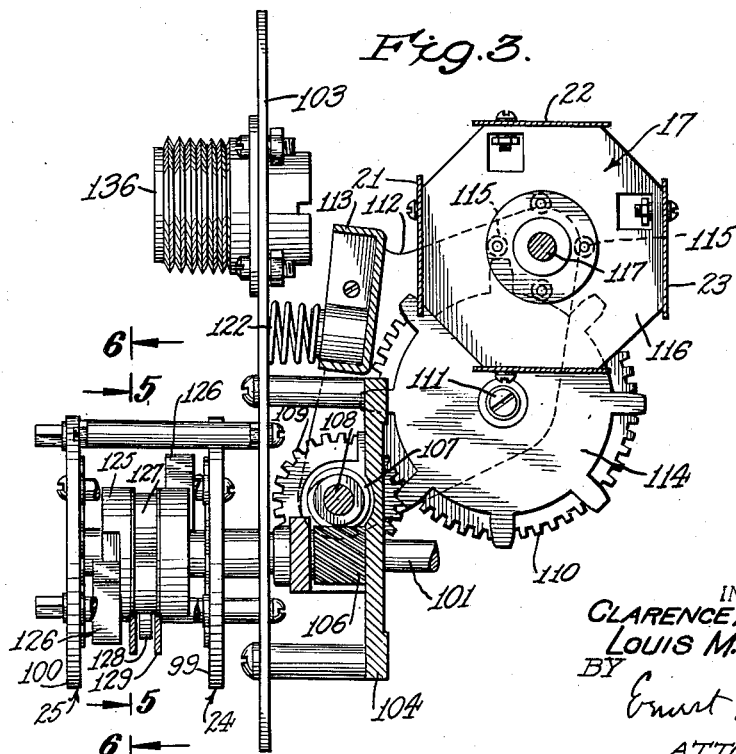
Fig. 3 shows the indicator of Fig. 2 with parts cut away to expose some of the indicator operating mechanism to view.

Figs. 5 and 6 are respectively, sections along the lines 5—5 and 6—6 of Fig. 3;

Fig. 7 is a section along the line 7—7 of Fig. 6;

Fig. 8 indicates diagrammatically a comparison of effective scale length made possible by the invention; and Fig. 9 illustrates a system embodying the invention in which the transmitters are allowed to overlap through certain portions of their travel.

Figure 1:
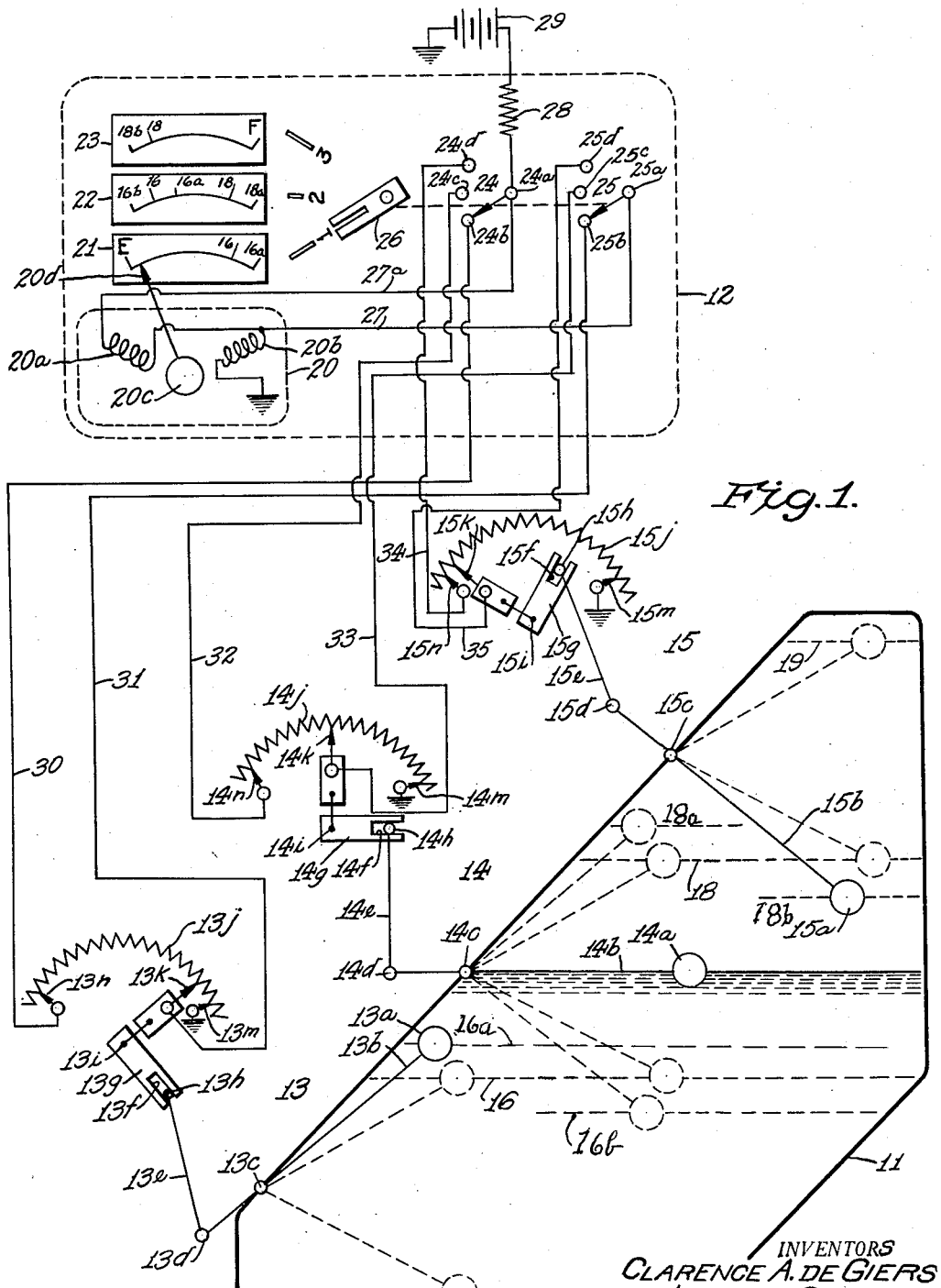
Fig. 1 illustrates schematically an arrangement of the invention, the liquid level shown not being related to the position of the indicator, which is shown diagrammatically only for clearness of illustration.

Fig. 1 illustrates schematically the basic principle of the invention. Tank 11 holds the fluid to be measured by indicator 12. By way of illustration, three float operated transmitters 13, 14 and 15 are so arranged in said tank that transmitter 13 will cover the lower portion of the tank up to level 16, transmitter 14 will cover the center portion of the tank, such as from level 16 to level 18 and transmitter 15 will cover the upper portion of the tank such as from level 18 to level 19.

Transmitters 13, 14 and 15 are of the conventional type, and in themselves are not novel. Referring to Fig. 1, transmitter 13 may be composed of a float 13a at the end of a float arm 13b and pivoted about a fixed point 13c. Cooperating with the float arm 13b is a link 13e pivoted at 13d to the float arm. The opposite end of link 13e engages in a slot 13f of cross arm 13g. The slot is for purposes of adjustment as will hereinafter be described in greater detail. Link 13e and cross arm 13g are articulated together by a screw 13h to form a floating pivot point. The opposite end of cross arm 13g is pivoted about fixed point 13i. These elements therefore provide a linkage system having two fixed pivot points at 13c and 13i and two floating pivot points at 13d and 13h. Rigidly attached to, but electrically insulated from cross arm 13g is a wiper 13k moving on a resistance strip 13j. For purposes of making electrical connections to said resistance strip, adjustable shoes 13n and 13m are provided at the ends of the strip. Transmitters 14 and 15 are similarly constructed, and hence require no further description. The mechanical arrangements of such a transmitter are shown in full and described in detail, for example, in Patent No. 2,104,898 to de Giers, one of the present co-inventors. The mechanical and electrical arrangements of the transmitter are also disclosed in de Giers Patent No. 2,405,689 and in Lingel Patent No. 2,339,021.

Figure 2:
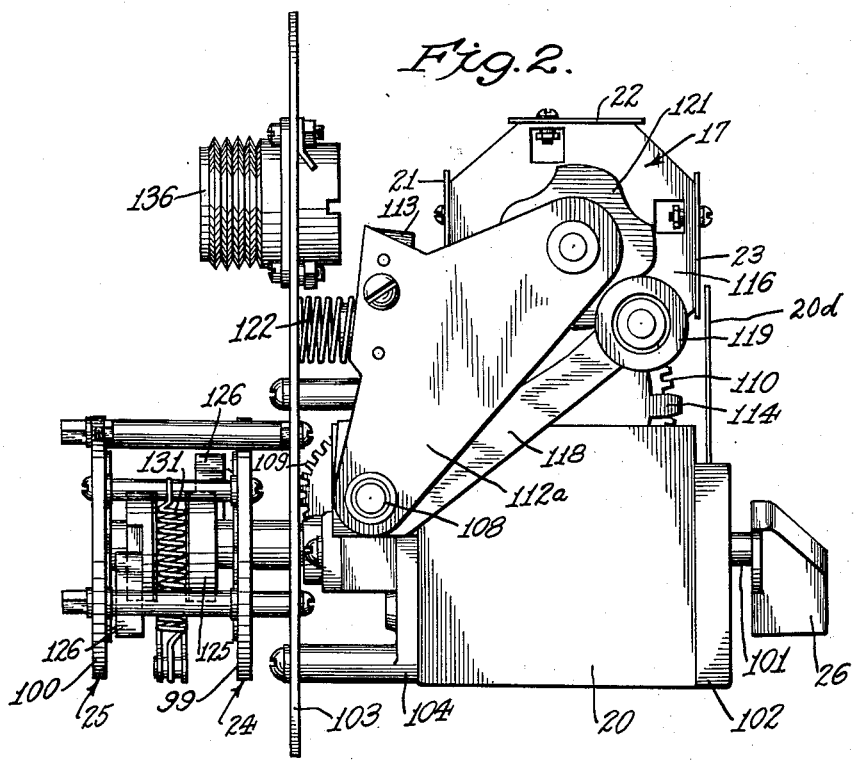
Fig. 2 is a side view of a typical indicator used in conjunction with the invention.

The indicator 12 is shown schematically in Fig. 1 and some of the structure in Figs. 2 and 3. It is composed essentially of an electrical indicating element 20 of any suitable type such as voltmeter or ratiometer of either the moving magnet or moving coil type. These meters are well known to those versed in the art, and hence no detailed description is necessary. By way of example, Fig. 1 shows a moving magnet ratiometer having two stationary coils 20a and 20b and a rotor 20c to which is attached a pointer 20d. Cooperating with the pointer 20d is a drum 17 (see also Figs. 2 and 3), carrying a number of dials 21, 22 and 23; and a selector switch having two separate sections 24 and 25. The common terminal 25a (Fig. 1) of switch section 25 is connected to the common junction of the two coils 20a and 20b by wire 27. Likewise the common terminal 24a of switch section 24 is connected to the opposite end of coil 20a through wire 27a. The opposite end of coil 20b may be grounded directly if desired. The proper dial and switch combination are selected by means of a knob 26 which can be manually set by hand from the front of indicator 12. The mechanism actuated by the knob 26 is hereinafter described in detail. It is sufficient here to point out that when, for example, said knob 26 is switched to position 1, dial 21 will appear on the face of the indicator and switch 24 will make contact between terminal 24b and common terminal 24a (see also Figs. 5 and 6) and simultaneously switch 25 will make contact between terminal 25b and common terminal 25a. Likewise when knob 26 is switched to position 2, dial 22 will appear on the face of the indicator and switch 24 will make contact between terminal 24c and common terminal 24a. Simultaneously switch 25 will make contact between 25c and common terminal 25a. When the knob is switched to position 3, dial 23 will appear on the face of the indicator. Switch 24 will make contact between terminal 24d and common terminal 24a and simultaneously switch 25 will make contact between terminal 25d and common terminal 25a. Power may be obtained from a source of supply such as a battery 29 and fed to the indicator through a dropping resistor 28, if required, and to terminal 24a.

The transmitters 13, 14 and 15 may be connected to the indicator 12 as follows: Adjustment shoe 13n of resistance strip 13j is connected to terminal 24b of switch 24 by line wire 30. Wiper 13k is connected to terminal 25b of switch 25 by line wire 31. These connections correspond to position 1 of index knob 26. Similarly shoe 14n of transmitter 14 is connected to switch terminal 24c, and wiper 14k is connected to switch terminal 25c through line wires 32 and 33 respectively. These connections correspond to position 2 of index knob 26. Also shoe 15n of transmitter 15 is connected to switch terminal 24d and wiper 15k is connected to switch terminal 25d, through line wires 34 and 35 respectively. These connections correspond to position 3 of index knob 26. Ends 13m, 14m and 15m of resistance strips 13j, 14j and 15j respectively may be grounded directly. It is apparent from these connections that the indicating element 20 can be successively connected to transmitters 13, 14 and 15, but that only one transmitter is in the circuit at any one time.

Assuming that the indicator is switched to position 1, and thus cooperating with transmitter 13, the adjustment of this transmitter will now be described in greater detail. Transmitter 13 is adjusted so that when the float is at the bottom of tank 11 the pointer 20d will read exactly over "E" on dial 21, and when float 13a is raised to level 16 the pointer 20d will read exactly over "16" on the same dial. These adjustments can be accurately made by either increasing or decreasing the wiper travel by adjustment of the position of the articulated connection 13h of link 13e in slot 13f of cross arm 13g. If it is desired to increase the pointer travel, the floating pivot point 13h is moved closer to the fixed point 13i. To decrease the pointer travel the opposite adjustment is made by moving the articulated connection 13h of the link 13e away from the pivot point 13i. Other adjustments are possible by using the adjustment shoes 13n or 13m as a finer adjustment. An important feature of the invention, however, is to permit float 13a to rise above level 16 when this level increases and preferably to make the float stop at some higher level such as 16a. This will cause the pointer 20d to travel off scale past the "16" mark indicating that it is necessary to switch the indicator by manipulation of the index knob 26 to a higher position.

Similarly, when the indicator is set for position 2, tank unit 14 is adjusted so that when float 14a is at level 16 the indicator will read "16" on dial 22, and when the float is at level 18, the indicator will read "18." In this case, float 14a is allowed to drop below level 16, such as at 16b, in order that the pointer may travel off scale at the low end of the scale and indicate that the indicator should be switched to the next lower position. At the top of its travel float 14a is allowed to travel to a position higher than 18, such as 18a so the pointer may travel off scale at the high end of the scale and indicate that the indicator should be switched to the next higher position. Similar adjustments are made to all other transmitters in the system.

In the application of this invention an indicator with as many as six dials has been found practical. Figure 8 illustrates by way of comparison of the effective scale lengths using from two to six dials as compared with a typical 300 degree scale of a conventional indicator. Scale 37 represents the scale length of two typical dials in an indicator such as 12 when placed end for end and arranged to cover a 300 degree span; scale 38 represents 3 such dials; 39, 4 dials; 40, 5 dials; and 41, 6 such dials. It will be apparent that when six dials are used, the effective scale length is more than twice as long as that found in a typical indicator having a 300 degree scale as indicated by scale 36. Since the scale has been made longer, it follows that the readability of the instrument is proportionally increased.

In the adjustment of the transmitters, it was indicated that each transmitter was adjusted at the normal top and bottom of its travel. Hence where the conventional transmitter can be adjusted to read exactly at two points, "Empty" and "Full" the arrangement used in the present invention can be adjusted to read exactly at a number of intermediate levels such as at "200" and "400" gallons. This improves the accuracy at other levels.

It will also become apparent from the description of the circuit arrangement, that since each transmitter is independent from all others, a failure in any one of them will not affect the readings of the others. Hence, assuming that the upper transmitter fails, the upper range under the supervision of transmitter 15, Fig. 1 will not be usable, but the two lower positions will still be operative and usable at their original accuracy. Hence while the operator is inconvenienced by not knowing what his upper level is, he will still be able to use the remaining sections of his system and not lose the complete use of his indicator. It will also be obvious that since each transmitter can be installed and adjusted independently of every other transmitter in the system, the problem of maintenance is greatly simplified.

While the system is generally operable in connection with transmitters having no overlap, it is preferred in accordance with the invention to provide transmitters which overlap and thereby obtain certain further advantages to be hereinafter described in greater detail. By way of example, Fig. 9 illustrates a tank equipped with three transmitters 42, 43 and 49 which are similar to 13, 14 and 15, Fig. 1, but in this case are made to overlap to a large extent in the amount of fluid spanned by each transmitter. Here again, the wiring has been conventionally indicated, but can be assumed to be entirely similar to that shown in Fig. 1. Transmitter 42 is made to cover the levels from "Empty" to "300" gallons. Transmitter 43 is made to operate from the "150" gallon level to the "450" gallon level, thus overlapping transmitter 42 from the "150" to the "300" gallon level. Transmitter 49 is made to operate from the "300" gallon level to the "600" gallon level, and thus overlaps transmitter 43 from the "300" to "450" gallon levels. Cooperating with the transmitters is indicator 12b having in position 1 a dial 21b calibrated from "E" to "300" gallons. In position 2 is dial 22b calibrated from "150" to "450" gallons. In position 3 is a dial 23b calibrated from "300" to "600" gallons.

In operation, as the fuel rises from "Empty" to "300" gallons, the pointer 20d will swing from "E" to "300" if the selector switch of indicator 12b is set to position when the fuel level rises above the 300 gallon level, the pointer will swing above the "300" mark indicating that the indicator should be set to position 2. If desired the section between "150" and "300" marks may be suitably identified as overlap sections so that the operator may know that he can switch to the next higher position at any time when the pointer is in the overlap zone. A similar procedure is followed for all other dials and positions.

The operator will turn the index knob 26 until he obtains a reading which is within the range of the scale and which will thus indicate the contents of the tank. However, if this scale reading comes in an overlap section, the operator knows that he can double check his reading on a higher or lower dial as indicated. Assuming that there are 350 gallons in the tank, but that this capacity is not known by the operator using the system, it will be obvious that if he switches to position 1, the pointer will swing off scale on the high side where he is instructed to "Read 2." When the operator switches to position 2, the pointer will indicate "350" gallons which is the contents of the tank. However, the "350" is indicated on the overlap section and the operator will know that by switching to position 3 he can double check the reading. When the indicator is switched to position 3, the pointer will read "350" on dial 22b.

A particular advantage of the overlap system is in the measurement of fuel in application such as for aircraft. In this case flying at various attitudes usually introduces appreciable errors in the measurement of the fuel. This error can be largely compensated for by the judicious placement of the various transmitters so that as the plane changes its flying attitude, one float in the overlap section will rise while the other will fall. Assuming again the "350" gallon level it will now be found that in position 2 the indicator may read "325" gallons while in position 3 the reading may be "375." By averaging these two readings, the correct indication of 350 gallons is obtained.

While the overlap system will necessarily result in a scale that is shorter than when no overlap is used, it has the advantage that the transmitters can be adjusted to read exactly at more points hence increasing the overall accuracy of the system.

The parts connected to and moved directly by manual adjustments of the index knob 26 are shown in Figs. 2, 3, 4, 5, 6 and 7 of the drawings. The knob 26 is secured to a shaft 101 journaled in the cover 102 of the electrical indicating instrument 20, in mounting plate 103, in a bracket 104 secured to the mounting plate and in two plates 99 and 100 of the switch sections 24 and 25. The plates 99 and 100 are circular and are each provided with a series of holes which may be employed to hold transmitter terminals in any desired number or desired relations.

Attached to the shaft 101 between the bracket 104 and the plate 103 is a spiral gear 106 meshing with a spiral gear 107 secured to a shaft 108 journaled in bosses or extensions which are integral parts of the bracket 104. Secured also to the shaft 108 is a spur gear 109 (Fig. 3) meshing with a larger gear 110 which turns on a stud screw 111 set in the side plate 112 of a yoke 113. Rigid with the gear 110 is a mutilated gear 114, the spaced apart teeth of which engage between pins 115 extending from the right-hand (as seen, Fig. 4) side plate 116 of the indicator dial drum 17. The drum 17 is secured to a shaft 117 journaled at one end in the side plate 112 and at its other end in the side plate 112a of the yoke 113. The yoke is pivoted as a unit on the shaft 108.

Rigidly secured to the bracket 104 in any suitable manner is an arm 118 (Figs. 2 and 4), carrying at its outer end a roller 119 cooperating with an indexing member 121 fastened on the shaft 101. The member 121 has its periphery so constructed to act as a plurality of cams. A pair of compression springs 122 act between the mounting plate 103 and the cross portion of the yoke 113 to hold the parts in the positions in which they are shown in Figs. 2 and 3. When the knob 26 is turned in either direction it will act through the connections described to rotate the dial carrying drum 17, and during this rotation the indexing cam member 121 will cooperate with the roller 119 to throw the drum back against the tension of the springs 122 sufficiently for the dials 21, 22 and 23 to clear the indicator pointer 20d. The member 121 and roller 119 cooperate under the influence of the springs 122 to hold the drum 17 in any position of adjustment.

Secured to the shaft 101 between the switch mounting plates 99 and 100 is a member 125 composed of insulating material and cut away across its two radial faces to form seats for contact members 126 composed, at least in part, of conducting material to form electrical connections between the common terminals 24a or 25a and the transmitter circuit terminals mounted in the holes in the plates 99 and 100. By turning the shaft 101 to place the pointer 20d selectively under the control of the tank floats, the common terminals will complete the corresponding transmitter circuits. The members 126 are secured in their seats by rivets 126a as shown in Fig. 7. The various circuits established by setting the knob 26 are illustrated diagrammatically in Fig. 1 and the various contacts have been indicated in Figs. 5 and 6 to correspond with the showing of Fig. 1. It will be obvious that the transmitter circuit contacts may be arranged in the holes in the plates 99 and 100 as desired for other embodiments. The switch parts are shown in Fig. 7 in the positions they occupy in the third position of the index knob 26, the third or right-hand dial (Fig. 9) being at that time set in reading relation with the indicator pointer 20d.

In order to assure correct alignment of the switch contacts the member 125 is constructed at an intermediate point to provide a lobed portion or member 127 cooperating with a roller which is loosely mounted on a rod supported at its ends in the side plates of a yoke 129 which is pivoted on a rod 130 secured at its ends in the switch mounting plates 99 and 100. A spring 131 holds the roller in contact with the periphery of the member 127, the roller, of course, cooperating with the recesses in said member both to insure complete movements of the movable switch contacts and hold them in accurate alignment with the stationary contacts. To facilitate adjustment of the movable contacts and at the same time insure satisfactory engagement with the stationary contacts, the switch points 132 and 133 are yieldingly mounted as shown, for example, in Fig. 7. Each contact consists of a cup-shaped shell slidable in a bore in the member 126 with a spring 134 acting between the closed end of the shell and a conductor strip 135 to hold the shell in its outermost position. A flange on the shell cooperates with a shoulder on the interior of the bore to limit outward movement of the shell. The springs 134 yield, of course, as the switch points 132 ride onto or over the stationary switch points of the transmitter circuits.

As seen in the drawings, Figs. 5 to 7, each contact member 126 is fixedly mounted to the member 125. This contact member 126 provides a continuous electrical connection between the contacts 132 and 133, each of which is formed as a cup-shaped member as shown in Fig. 7 and as hereinabove described. The electrical connection between these points may be traced through the springs 134 and the conductor strip 135. As the contact members 126 are arranged in a non-radial relation, as shown best in dotted lines in Fig. 6, the radially inner contacts 133 may be arranged to make continuous contact with a member 25a, which in practice may be formed as a slip ring and is seen in part in Fig. 7, being designated by the left-hand arrow to reference character 25a in that figure. The contact 132 is positioned on an outer radius and is arranged to make contact selectively with the several fixed contacts, such as 25b, 25c and 25d, contact 25d being shown connected in Figs. 6 and 7. In general, the electrical arrangement is thus substantially the same as that shown in Figs. 3 and 6 of De Giers Patent No. 2,154,066.

No attempt has been made to show the wiring in Figs. 2 to 7 of the drawing owing to the difficulties of illustration and because that wiring is diagrammatically illustrated in other figures. However, it can be stated that the wires from the various switch contacts lead to an outlet 136 with their ends attached to terminals mounted in the usual plug member (not shown) within the outlet. A corresponding plug member may be inserted in the outlet to connect the float controlled transmitter circuits for selective operation by adjustment of the index knob 26.

It will be noted that the dial 17 is constructed to provide four dial faces, only three of which have been used in the illustrative embodiments described. The fourth dial may be used for indicating an "off" condition or it may be employed for an additional float system where three dials are insufficient to cover the capacity of the tank.

From all the foregoing it is believed to be clear that the dial changing mechanism just described and the switch contacts are so synchronized that when a dial is set in reading relation with the indicator pointer 20d, the transmitter associated with the float represented by the positioned dial will be connected to the pointer 20d and that thereafter the position of the float or the level of the fluid in the tank will be visually indicated by the dial and pointer until the liquid level passes out of the range of that particular float; and that changes of the level in any part of the tank may be ascertained by turning the dial drum in either direction to determine which float or floats should be put in control of the pointer to indicate the contents of the tank.

What is claimed is:

Apparatus for accurately indicating the level of liquid in a tank which is of such shape that the entire range of liquid levels cannot accurately be supervised by a single float, comprising a plurality of floats mounted in said tank at different levels, each of said floats being sensitive to a predetermined range of liquid levels, all the ranges together covering the entire range of liquid levels to be indicated and said ranges overlapping one another by predetermined amounts, a voltage-dividing, potentiometer-type transmitter connected to be independently actuated by each of said plurality of floats; a single receiving and indicating instrument of the ratiometer type and including a movable indicator pointer and a plurality of deflecting coils arranged to be selectively electrically connected to each said transmitter; electrical connections from all transmitters to said receiving instrument, selective electric switch means interposed in said electrical connections for connecting said receiving instrument to each of said transmitters, a drum carrying a plurality of scales which are arranged by rotation of said drum to cooperate selectively and optically with said indicator pointer, and a single manually movable element which is mechanically connected to rotate said drum and also to move a movable part of said selective electric switch means, so as simultaneously to position a proper one of said scales in an operative position to cooperate with said indicator pointer when said switch means is moved electrically to connect each of said transmitters with said receiving instrument, whereby said transmitters and floats may be used independently to give an accurate indication of the liquid levels respectively supervised thereby, and whereby in the overlap zones of any two of said ranges respectively a check on liquid level indication may be obtained using two independently operating float and transmitter means.

CLARENCE A. DE GIERS.
LOUIS M. CAMPANI.

REFERENCES CITED

The following references are of record in the file of this patent:

UNITED STATES PATENTS

| Number | Name | Date |
| --- | --- | --- |
| 2,101,296 | Simpson et al. | Dec. 7, 1937 |
| 2,103,606 | Abrahamsohn et al. | Dec. 28, 1937 |
| 2,104,898 | De Giers | Jan. 11, 1938 |
| 2,154,066 | De Giers | Apr. 11, 1939 |
| 2,298,893 | MacIntyre | Oct. 13, 1942 |

Certificate of Correction

Patent No. 2,516,452                                                                July 25, 1950

CLARENCE A. DE GIERS ET AL.

It is hereby certified that error appears in the printed specification of the above numbered patent requiring correction as follows:

Column 5, line 70, for the words "position when" read *position 1. When*;

and that the said Letters Patent should be read as corrected above, so that the same may conform to the record of the case in the Patent Office.

Signed and sealed this 17th day of October, A. D. 1950.

[SEAL]

THOMAS F. MURPHY,
*Assistant Commissioner of Patents.*